United States Patent [19]

Mercier

[11] Patent Number: 5,513,466
[45] Date of Patent: May 7, 1996

[54] PROTECTIVE CONTAINER ESPECIALLY FOR VINE PLANTS

[75] Inventor: Jean-Pierre Mercier, Vix, France

[73] Assignee: Mercier France Phytonique SA, Le Gue De Velluire, France

[21] Appl. No.: 374,437

[22] Filed: Jan. 19, 1995

[30] Foreign Application Priority Data

Jan. 20, 1994 [FR] France .................................... 94 00801

[51] Int. Cl.$^6$ ............................ A01G 13/10; A01G 17/00
[52] U.S. Cl. ...................................... 47/23; 47/30
[58] Field of Search .............................. 47/23, 30, 30 OT, 47/24

[56] References Cited

U.S. PATENT DOCUMENTS

| 223,093 | 12/1879 | Barnhill et al. ........................... 47/23 |
| 770,461 | 9/1904 | Haggerty ................................... 47/23 |
| 1,089,012 | 3/1914 | Sandahl ................................... 47/23 |
| 4,845,889 | 7/1989 | Taylor ..................................... 47/23 |
| 4,922,652 | 5/1990 | Graves ..................................... 47/23 |
| 5,245,878 | 9/1993 | Underwood . |

FOREIGN PATENT DOCUMENTS

| 209 | 9/1895 | Denmark ................................... 47/30 |
| 1032163 | 6/1953 | France . |
| 2643786 | 9/1990 | France . |
| 456229 | 6/1968 | Switzerland . |
| 10998 | of 1907 | United Kingdom ....................... 47/23 |
| 149102 | 11/1919 | United Kingdom . |
| 2104366 | 3/1983 | United Kingdom . |
| 2230929 | 11/1990 | United Kingdom . |
| 2249704 | 5/1992 | United Kingdom . |
| 91/15946 | 10/1991 | WIPO . |

Primary Examiner—Terry Lee Melius
Assistant Examiner—Joanne C. Downs
Attorney, Agent, or Firm—Greenblum & Bernstein

[57] ABSTRACT

Protective container, especially adapted for vines, is provided with a sleeve comprising two semi-shells adapted to envelope a plant. A journal connects the two semi-shells and a latching element maintains the two semi-shells in a closed positioned so that the sleeve has a general shape of a tube open at both ends. The sleeve is sufficiently rigid so as to act as a support, and includes a lower portion adapted to be at least partially buried and envelope a root system of a plant, an upper portion constructed and arranged to enable free access therein, and an intermediate tubular portion, having reduced dimensions and reinforced mechanical resistance, separating the lower and upper portions. Projections in the general shape of teeth of a comb extend from the lower end of the lower portion to retain the root system of the plant and a substrate. The upper portion includes an openable portion which is selectably closable.

20 Claims, 1 Drawing Sheet

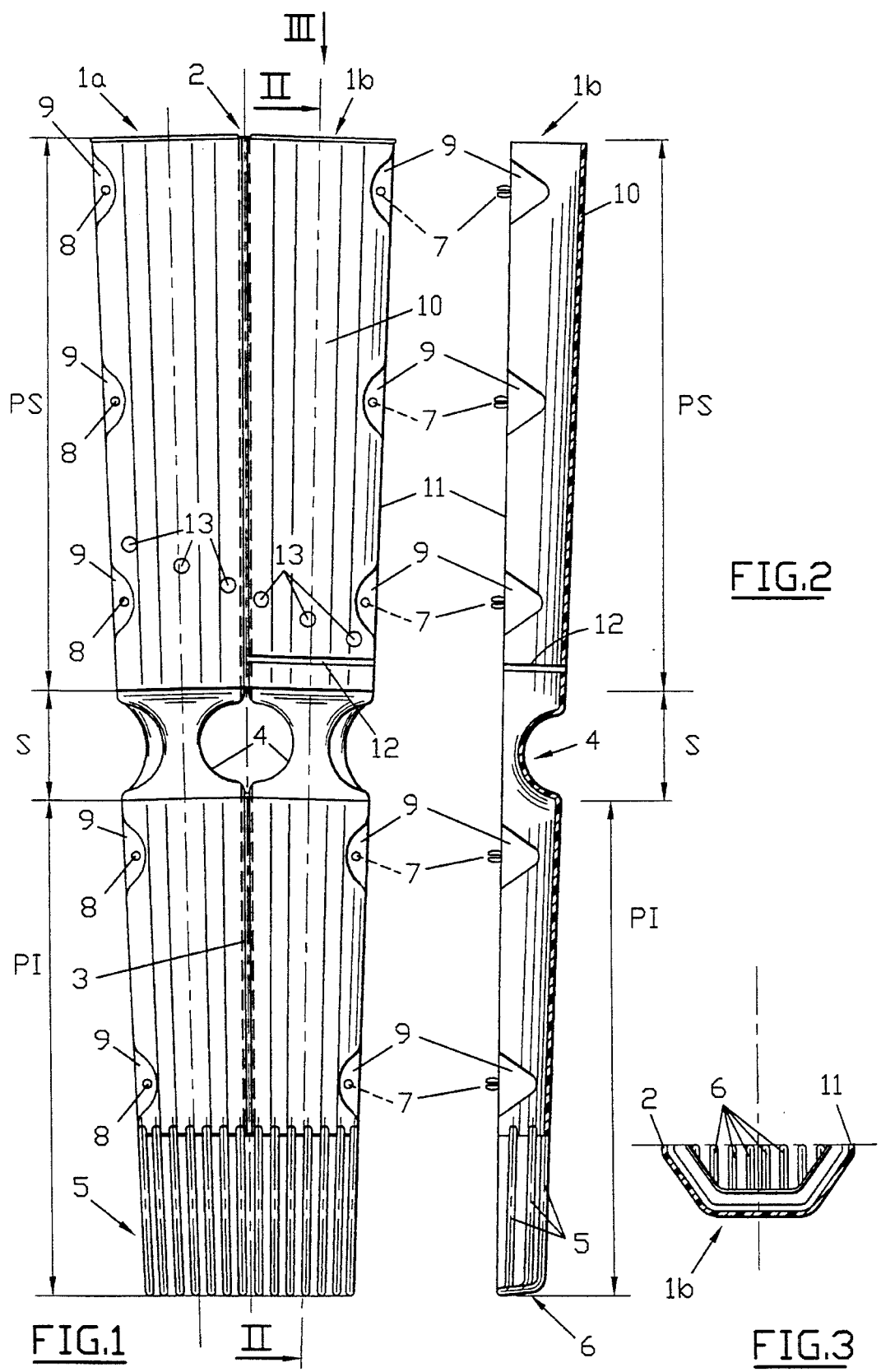

PROTECTIVE CONTAINER ESPECIALLY FOR VINE PLANTS

BACKGROUND OF THE INVENTION

1. Field of the Invention

The present invention is related to a protective container for young plants, and more specifically to a packaging device enabling the storage and transport of such young plants, as well as their protection once they are planted during the most vulnerable period of their lives.

The invention especially applies to vines, but generally speaking, can also be applied to all plants or bushes, whether fruit-bearing or otherwise.

2. Discussion of Background Information

FR-2,643,786 discloses a device of this type, provided with a sleeve comprising two portions, the lower portion adapted to be at least partially submerged in the soil and enveloping the root ball of the plant as well as the plant, and the upper portion arranged so as to provide free access within. The material of said sleeve being rigid enough so that it acts as a support Such a device has proven, over time, despite its undeniable qualities of efficiency especially as regards the protection of the plant, both before and after planting, to be inadequate from some aspects such as ease of implementation and use, and resistance to some types of attacks, especially as regards shocks due to contact with vineyard plow guides.

SUMMARY OF THE INVENTION

It is the an object of the present invention to overcome the various disadvantages associated with devices, such as disclosed in FR-2,643,786.

As such, the invention is directed towards an improved protective container, especially for vines, of the type constituted by a sleeve enveloping the plant, comprising a lower portion adapted to be at least partially buried in soil and enveloping the root system of the plant, and an upper portion arranged so as to provide free access therein, the material of the sleeve being sufficiently rigid so that the sleeve acts as a support, characterized in that the sleeve assembly is constituted of two semi-shells, generally shaped like a tube open at both ends, journaled with respect to one another and capable of being closed with the help of appropriate latching means, the lower portion being extended at its end by projections in the shape of the teeth of a comb, adapted to retain the root system of the plant as well as the substrate, the upper portion comprising an openable portion that can be closed at will, arranged in one of the semi-shells, and wherein both portions, upper and lower, are separated by an intermediate tubular portion having reduced dimensions and reinforced mechanical resistance.

BRIEF DESCRIPTION OF THE DRAWINGS

Other characteristics and advantages will become apparent from the following description of a preferred embodiment of the device as per the invention, such description being provided only as an example and in reference to the annexed drawing wherein:

FIG. 1 is a top view of a protective container constituted by two semi-shells in the open position, FIG. 2 is a sectional view along line II—II of the protective container of FIG. 1, and FIG. 3 is an end view along arrow III of the right semi-shell of the protective container of FIG. 1.

DETAILED DESCRIPTION OF THE PREFERRED EMBODIMENTS

The protective container represented in the drawing is constituted of two semi-shells 1a, 1b substantially identical and connected along a common edge by a flexible hinge.

Advantageously, the entire device is obtained from one single element by molding an appropriate plastic material, for example, polypropylene, the hinge between the two semi-shells 1a, 1b being obtained by a bridge of a small thickness ensuring the necessary journal between the semi-shells.

More specifically, the device as per the invention is constituted by a tubular sleeve formed by the two semi-shells 1a, 1b that are closed. In FIG. 1 the two semi-shells are shown in an external view.

Each semi-shell 1a, 1b comprises a lower portion PI and an upper portion PS, connected to each other by a section S having reduced height and dimensions.

Both upper portions PS of the two semi-shells are connected by a flexible hinge 2 and both lower portions PI by a flexible hinge 3 in alignment with hinge 2.

Once the two semi-shells 1a, 1b are closed upon one another, they constitute a tubular sleeve whose section widens from the bottom to the top. The sleeve has either a circular or polygonal section (as illustrated in FIG. 3), the latter shape ensuring a better rigidity.

The connection zone S has an approximately dual wheel shape with a central portion 4, for example, having a circular section and a substantially reduced diameter with respect to the diameter of the adjacent portions PI and PS. In addition, the wall of section S is substantially thickened for a reason that will be explained later in the specifications.

At its lower end, portions PI are extended by parallel projections 5 in the shape of the teeth of a comb, and whose ends 6 (FIGS. 2 and 3) are curved in the direction of the center of the sleeve such that once the semi-shells 1a, 1b are closed on one another to constitute the sleeve, the inner orifice of the latter is entirely occupied by the curved ends 6.

The lower portion of the sleeve, with teeth 5 is intended to contain and retain the roots, of a vine for example, as well as the accompanying soil, especially the long fiber based special soil. The teeth system 5 retains such a substrate well and promotes the aeration and expansion of the roots once the plant is in place.

The two semi-shells 1a, 1b close upon one another by latching by virtue of projections 7 that get force fitted, in the manner of press-buttons, in holes 8. Projections 7 and holes 8 are arranged in the planar portions 9 obtained across from each other from place to place along edges 11 of the semi-shells, opposite hinges 2, 3.

In addition, one of the upper portions PS of the semi-shells (1b) is itself openable by means of a flap 10 constituted by almost the entire wall of the upper portion and demarcated by hinge 2, the free edge 11 opposite hinge 2 of semi-shell 1b, and at the lower portion, a horizontal cut-out 12 extending from hinge 2 to the opposite edge 11.

The lower portion PI of the protective container corresponds to that portion that is to be buried with the plant inside it.

To this end, section S constitutes a marker and should be slightly above the soil line. The shape and reinforcement of portion S are adapted to facilitate the passage of the vineyard plow guides and to protect the sleeve with respect to such guides.

Portion S also acts as a marker for the positioning of the graft.

Each time that it is necessary to reach inside the aerial portion (PS) of the sleeve, especially to prune the vine, one can very easily open flap 10 by pulling apart elements 7, 8, pruning as desired, and then once again, closing the flap.

This aerial portion (PS) is advantageously provided with openings 13 for aerating the interior of the sleeve. Preferably, openings 13 are circular holes arranged in a helix in the lower portion of said aerial portion (PS), such an arrangement resulting in an optimal aeration.

The assembly of the semi-shells and the accessory elements (teeth 5, latching members 7, 8, aeration holes 13 etc. . . ) is advantageously obtained in one piece by a single molding operation.

Finally, the invention is naturally not limited to the embodiment represented and described hereinabove, but on the contrary, encompasses all variations thereof, especially those concerning the shapes, dimensions and arrangements of portions PI, PS, S, of projections (5, 6) for retaining the root system, of flap 10 for access to the aerial portion PS of the sleeve, of the attachment/detachment means of the free edges 11 of the two semi-shells 1a, 1b.

Flap 10 can be, in a variation, constituted by a portion that can be separated from aerial portion PS of the sleeve, attachment/detachment means being provided to this end between the two portions, with possibly a small bridge or retention attachment of the flap.

I claim:

1. Protective container, especially for vines, comprising:
   a sleeve adapted to envelope a plant, said sleeve comprising two semi-shells, a journal connecting said two semi-shells, and a latching element enabling maintaining of said two semi-shells in a closed positioned so that the sleeve has a general shape of a tube open at both ends:
   said sleeve being sufficiently rigid so as to act as a support, and comprising a lower portion adapted to be at least partially buried and envelope a root system of a plant, an upper portion constructed and arranged to enable free access therein, and an intermediate tubular portion separating said lower portion from said upper portion, said intermediate portion having reduced dimensions compared to said upper portion and said lower portion, and having reinforced mechanical resistance;
   said lower portion of said sleeve comprising a lower end, and projections comprising a general shape of teeth of a comb extending from said lower end of said lower portion to retain the root system of the plant and a substrate; and
   said upper portion comprising an openable portion, said openable portion constituting a longitudinal section of said upper portion of one of said two semi-shells, said openable portion capable of being closed at will.

2. The protective container according to claim 1, wherein said intermediate portion comprises a central cylindrical portion comprising a reduced diameter with respect to diameters of adjacent portions of said lower portion and said upper portion.

3. The protective container according to claim 1, wherein said projections are curved in a direction towards a center portion of said sleeve.

4. The protective container according to claim 1, wherein said lower portion and said upper portion comprise upwardly widening cross-sections.

5. The protective container according to claim 1, wherein said lower portion and said upper portion comprise circular cross-sections.

6. The protective container according to claim 1, wherein said lower portion and said upper portion comprise polygonal cross-sections.

7. The protective container according to claim 1, wherein said latch element comprises at least one opening and at least one corresponding protrusion.

8. The protective container according to claim 1, comprising aeration holes in said upper portion.

9. The protective container according to claim 8, wherein said aeration holes are helically arranged in said upper portion.

10. The protective container according to claim 1, wherein said two semi-shells are composed of a molded plastic material, and said journal comprises a flexible hinge obtained during molding of said plastic material.

11. The protective container according to claim 10, wherein said openable portion comprises a flap defined by said hinge, an edge of one of said two semi-shells opposite said hinge, and a cut-off line positioned between a lower end and an upper end of said upper portion.

12. The protective container according to claim 10, wherein said intermediate portion comprises a central cylindrical portion comprising a reduced diameter with respect to diameters of adjacent portions of said lower portion and said upper portion.

13. The protective container according to claim 12, wherein said projections are curved in a direction towards a center portion of said sleeve.

14. The protective container according to claim 13, wherein said lower portion and said upper portion comprise upwardly widening cross-sections.

15. The protective container according to claim 22, wherein said lower portion and said upper portion comprise upwardly widening cross-sections.

16. The protective container according to claim 15, wherein said lower portion and said upper portion comprise circular cross-sections.

17. The protective container according to claim 15, wherein said lower portion and said upper portion comprise polygonal cross-sections.

18. The protective container according to claim 15, wherein said latch element comprises at least one opening and at least one corresponding protrusion.

19. The protective container according to claim 18, comprising aeration holes in said upper portion.

20. The protective container according to claim 19, wherein said aeration holes are helically arranged in said upper portion.

* * * * *